A. K. WOOD.
LIQUID DISPENSER.
APPLICATION FILED SEPT. 10, 1919.
1,341,095.
Patented May 25, 1920.
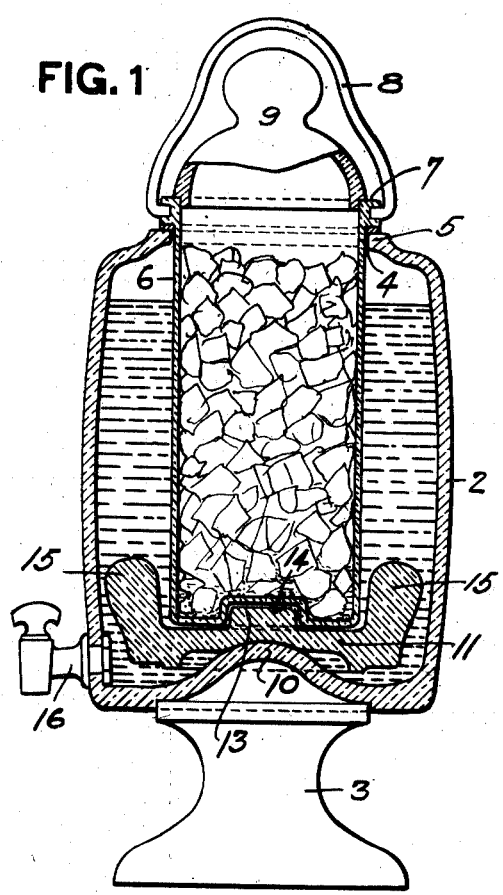
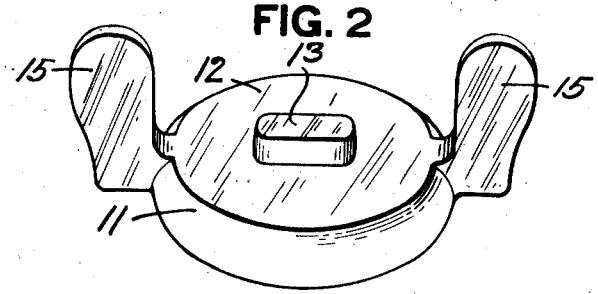
INVENTOR
Arch K. Wood

UNITED STATES PATENT OFFICE.

ARCH K. WOOD, OF JEANNETTE, PENNSYLVANIA, ASSIGNOR TO McKEE GLASS COMPANY, OF JEANNETTE, PENNSYLVANIA, A CORPORATION OF PENNSYLVANIA.

LIQUID-DISPENSER.

1,341,095.   Specification of Letters Patent.   Patented May 25, 1920.

Application filed September 10, 1919. Serial No. 322,849.

*To all whom it may concern:*

Be it known that I, ARCH K. WOOD, a citizen of the United States, and resident of Jeannette, in the county of Westmoreland and State of Pennsylvania, have invented a new and useful Improvement in Liquid-Dispensers; and I do hereby declare the following to be a full, clear, and exact description thereof.

My invention relates to beverage dispensers.

The object of my invention is to provide a liquid cooler in which all the parts are preferably formed of glass including means for agitating the liquid before it is drawn, as for instance in the case of buttermilk, where the water collects at the top, and it is desirable to agitate the same before drawing off in order to have the buttermilk drawn at the proper consistency.

To these ends my invention comprises the novel features hereinafter set forth and claimed.

In the accompanying drawing, Figure 1 is a vertical sectional view of a liquid cooler showing my invention applied thereto, and Fig. 2 is an enlarged perspective view of the agitator.

In the drawing the numeral 2 designates the liquid containing vessel which may be of any suitable design and preferably formed of glass supported on a base or foot-portion 3. The opening 4 at the upper end of the liquid vessel 2 is surrounded by the neck 5. The inner ice vessel or container 6 is likewise preferably formed of glass, and said vessel has the flange-portion 7 at its upper end, which forms a shoulder resting on the neck 5 of the liquid-container 2. A bail 8 is connected to the upper end of the ice container 6 for lifting the same or for turning said container while in position in the vessel 2 for the purpose more fully hereinafter set forth.

A suitable cover 9 closes the upper end of the ice container 6.

At the bottom of the liquid container 2 is formed a suitable convex seat 10 adapted to support the stirrer or agitator 11. This agitator 11 is likewise preferably formed of glass and has the central circular portion 12 which fits over the convex seat 10, said seat forming a bearing upon which said agitator may be readily turned.

On the upper face of the circular portion 12 of the agitator is the lug 13 which is adapted to be engaged by a correspondingly shaped recess 14 formed in the bottom of the ice-container 6. The shape of the lug 13 and of the recess 14 is such that any rotary movement imparted to the ice container 6 will impart a like rotary movement to the agitator.

The agitator 11 is provided with the wings 15 which project out beyond the circular portion 12 of said agitator.

A suitable spigot 16 is provided for drawing off the contents from the liquid container 2.

Where the liquid container 2 contains buttermilk or other beverage which requires stirring before being drawn, the bail 8 is grasped by the hand and the ice containing vessel 6 is turned or oscillated back and forth, and due to the engagement of the lower end of said container with the lug 13 of the agitator, a like rotary or oscillatory movement will be imparted to said agitator, whereby the contents of the liquid container 2 will be stirred or agitated so as to be thoroughly mixed before being drawn from the spigot 16.

By having the agitator formed of glass like the other parts of the cooler, I provide an all glass sanitary cooler, and furthermore the agitator does not absorb the liquid and become foul or rancid, as where a wooden or even a metal stirrer or agitator is employed.

What I claim is:

1. In a liquid cooler, the combination of a liquid containing vessel, an agitator in said vessel resting on the bottom thereof, an ice containing vessel within said first vessel, and connections between the lower end of said ice vessel and said agitator whereby when said ice vessel is turned said agitator is likewise turned.

2. In a liquid cooler, the combination of a liquid containing vessel having a convex seat at the bottom thereof, an agitator fitting over said seat, an ice containing vessel, and connections between said ice containing vessel and said agitator whereby when said ice containing vessel is turned said agitator is likewise turned.

3. In a liquid cooler, the combination of a liquid containing vessel having a convex seat at the bottom thereof, an agitator resting on said seat, a lug on said agitator, an ice containing vessel, having a recess engaging said lug on said agitator and forming a non-rotary connection between said parts whereby when said ice containing vessel is turned a like turning movement is imparted to said agitator.

4. In a liquid cooler, the combination of a liquid containing vessel having a convex seat at the bottom thereof, an agitator having a central portion engaging said seat, and wings extending beyond said central portion, an ice containing vessel, and connections between said ice containing vessel and said agitator, whereby when said ice containing vessel is turned a like turning movement is imparted to said agitator.

5. In a liquid cooler, the combination of a liquid containing vessel having a convex seat at the bottom thereof, an agitator resting on said seat, an ice containing vessel, connections between said ice containing vessel and said agitator, and a bail connected to the upper end of said ice containing vessel.

In testimony whereof I, the said ARCH K. WOOD, have hereunto set my hand.

ARCH K. WOOD.

Witnesses:
 ROBT. D. TOTTEN,
 JOHN F. WILL.